(12) United States Patent
Korb et al.

(10) Patent No.: US 11,418,556 B2
(45) Date of Patent: Aug. 16, 2022

(54) SEAMLESS TRANSITION OF SOURCE OF MEDIA CONTENT

(71) Applicant: Sonos, Inc., Santa Barbara, CA (US)

(72) Inventors: Cameron Ellison Korb, Boston, MA (US); David Lawrence Bernstein, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/208,601

(22) Filed: Mar. 22, 2021

(65) Prior Publication Data
US 2021/0297469 A1 Sep. 23, 2021

Related U.S. Application Data

(60) Provisional application No. 62/993,361, filed on Mar. 23, 2020.

(51) Int. Cl.
*G06F 3/16* (2006.01)
*H04L 65/61* (2022.01)

(52) U.S. Cl.
CPC .......... *H04L 65/4069* (2013.01); *G06F 3/165* (2013.01)

(58) Field of Classification Search
CPC .. H04L 65/4069; H04L 65/1069; G06F 3/165
USPC ...................................................... 709/219
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Jo et al; "Synchronized One-to-Many Media Streaming with Adaptive Playout Control"; Proceedings of SPIE; 2002 pp. 71-82; vol. 4861.*

(Continued)

*Primary Examiner* — Glenford J Madamba

(57) ABSTRACT

In one aspect, a playback device is configured to (i) receive a first stream of audio data representing audio content from a computing system, (ii) detect an indication that a source of the audio content is to switch from the computing system to a user device; (iii) after detecting the indication, establish a point-to-point wireless link with the user device over which to receive a second stream of audio data; (iv) receive the second stream of audio data representing the audio content; (v) determine a future time at which to transition from playing back the audio content using the first stream of audio data to playing back the audio content using the second stream of audio data; and (vi) at the future time, transition from playing back the audio content using the first stream of audio data to playing back the audio content using the second stream of audio data.

20 Claims, 9 Drawing Sheets

(56) References Cited

U.S. PATENT DOCUMENTS

| | | | |
|---|---|---|---|
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 * | 7/2012 | Millington .............. G06F 16/68 709/248 |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2018/0088901 | A1 * | 3/2018 | Drinkwater ............. H04L 65/60 |
| 2021/0255821 | A1 * | 8/2021 | Millington ............. G11B 27/10 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

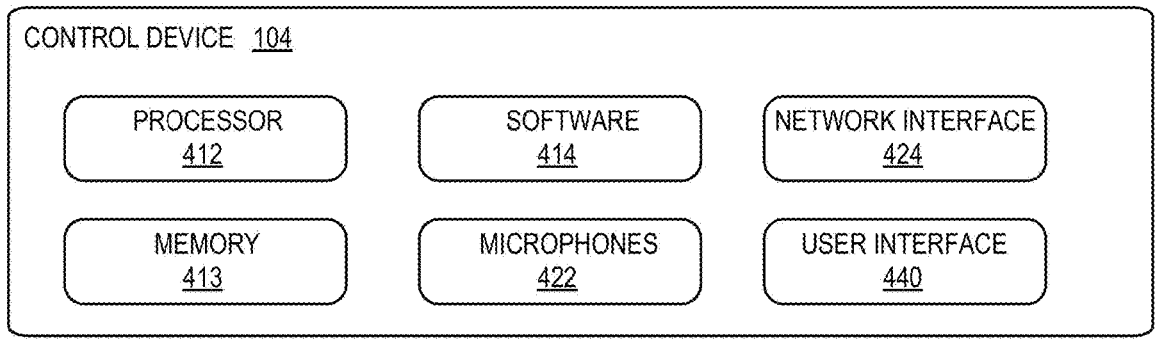
Fig. 4A
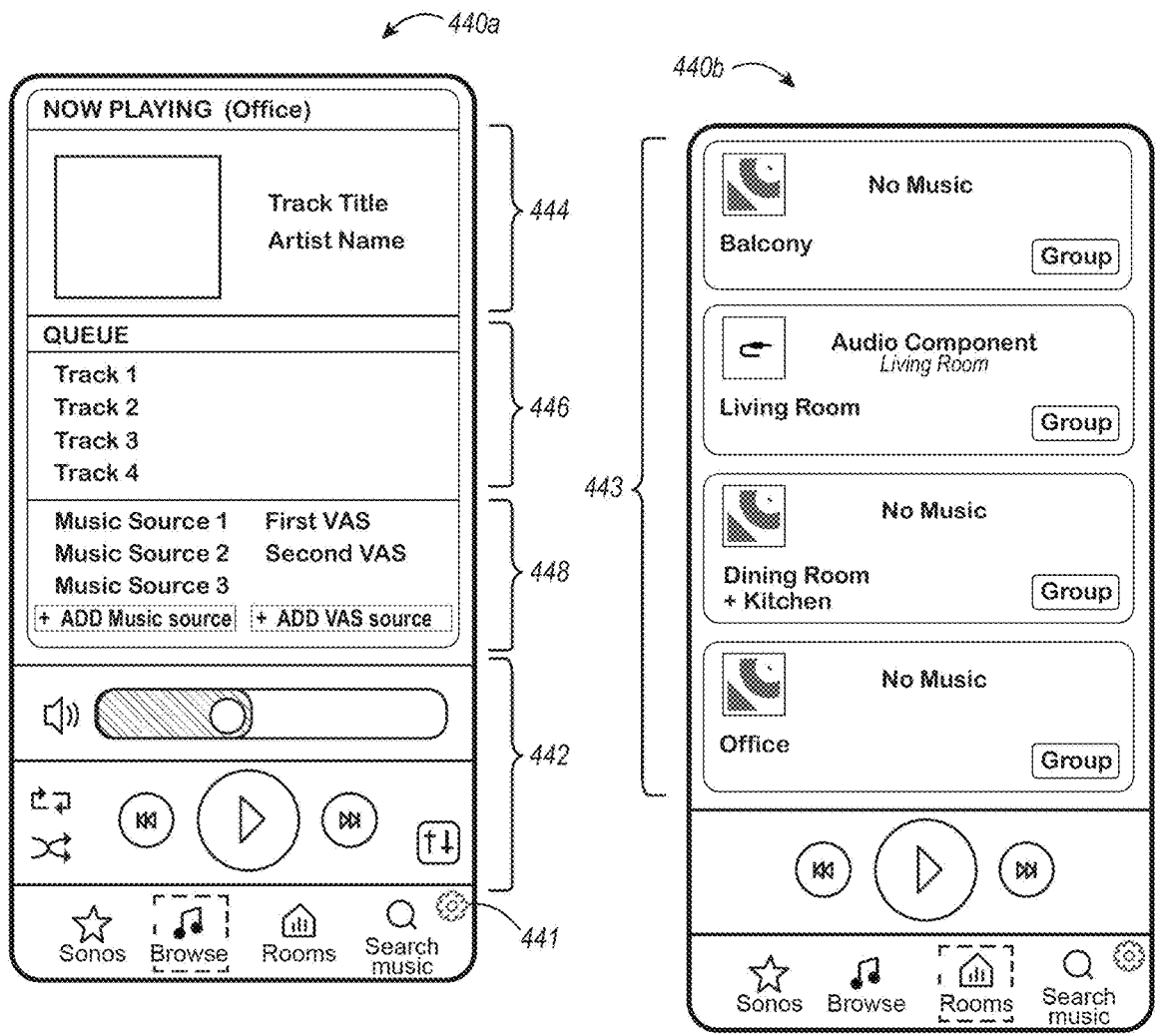
Fig. 4B
Fig. 4C

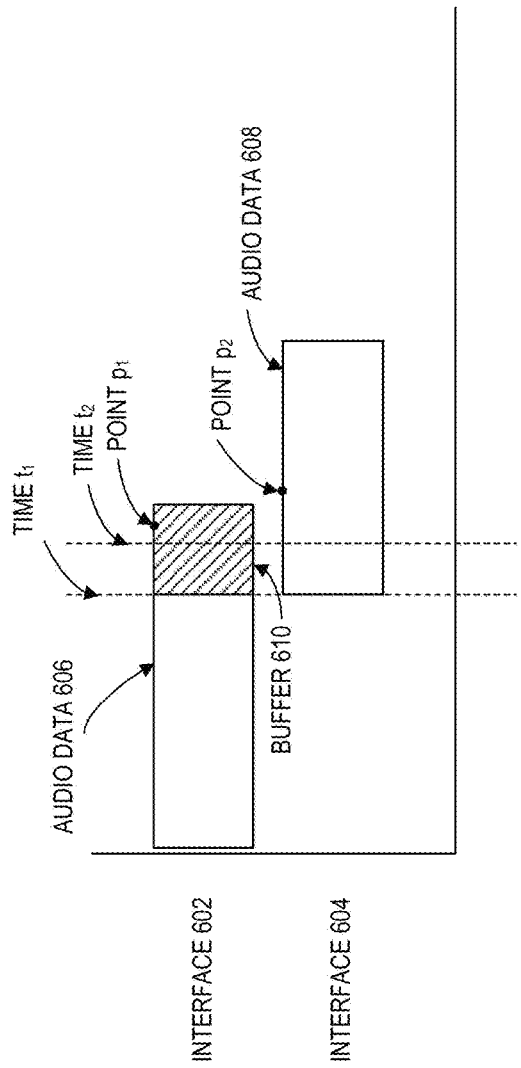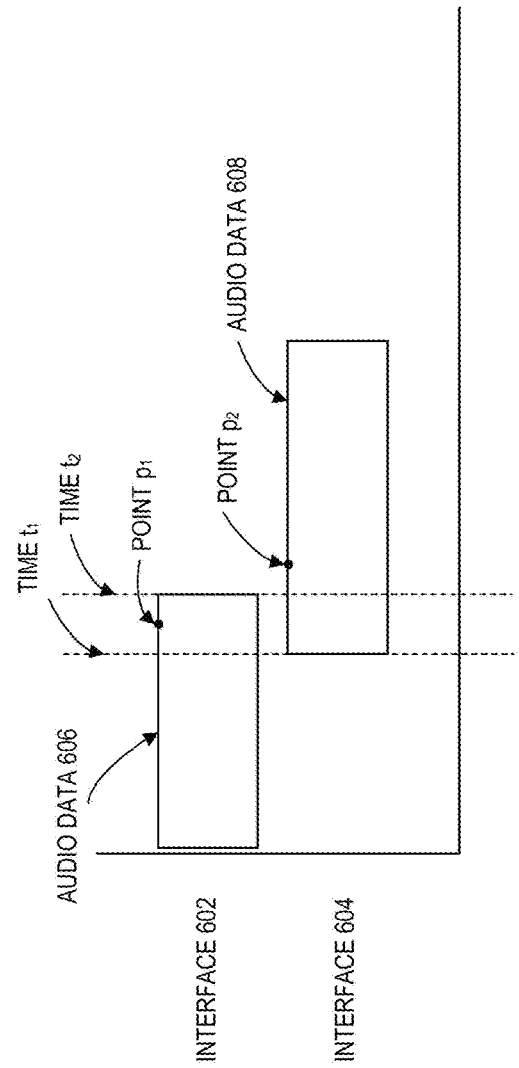

SEAMLESS TRANSITION OF SOURCE OF MEDIA CONTENT

CROSS-REFERENCE TO RELATED APPLICATION

This application claims the benefit under 35 U.S.C. § 119 of U.S. Provisional Patent App. No. 62/993,361, filed Mar. 23, 2020, which is incorporated herein by reference in its entirety.

TECHNICAL FIELD

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIG. 4A is a functional block diagram of an example controller device in accordance with aspects of the disclosure.

FIGS. 4B and 4C are controller interfaces in accordance with aspects of the disclosure.

FIG. 6A is a timing diagram for switching the source of audio content in accordance with aspects of the disclosure.

FIG. 6B is a timing diagram for switching the source of audio content in accordance with aspects of the disclosure.

Figure 1A:
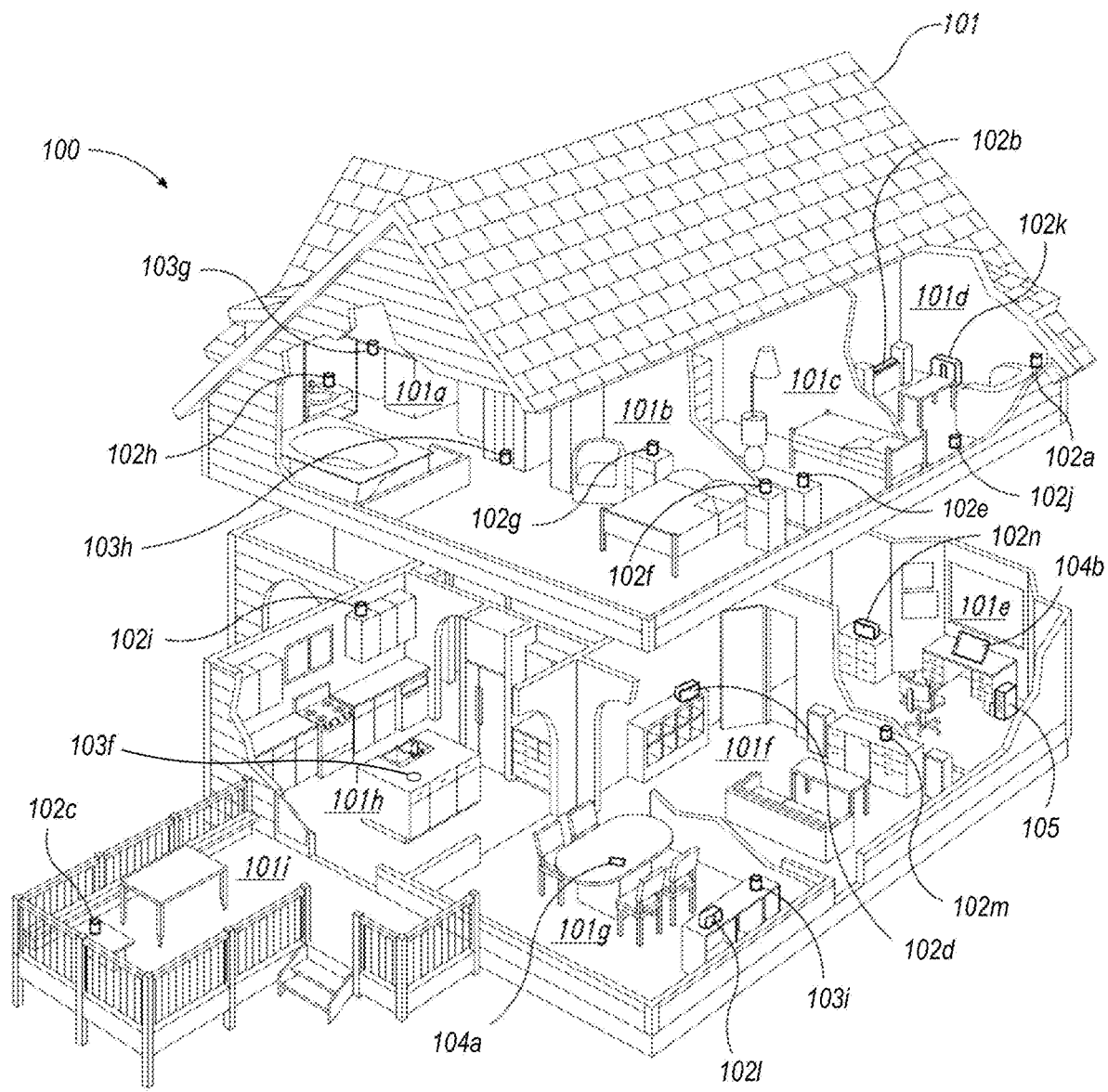
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Media playback systems may contain one or more playback devices (e.g., zone players) that are communicatively coupled to one another and configured to play back media or audio content in synchrony with one another. In these media playback systems, devices are typically stationary and thus are configured to retrieve and pass information via one or more networks in the location in which the devices are located, using a particular communication interface that is configured to facilitate communications. In order to play back audio content, the devices are generally configured to (i) retrieve audio content from a computing system (e.g., a cloud-based computing system) via the particular communication interface, and (ii) play back the audio content via one or more speakers.

Consumers, however, have developed an increasing desire to move the playback devices around within the media playback system, and in some cases, even move them outside of the network on which they were set up. As a result, consumers increasingly expect their playback devices to continue playing the audio content regardless of where the speaker is located.

One challenge presented by this expectation is that the playback device, as discussed above, is generally configured to retrieve the audio content via a cloud-based computing system via a communication interface that is configured to facilitate communication with the cloud-based computing system over a network. Thus, when the playback device leaves that network, the playback device must retrieve the audio content via a different mechanism in order to continue playing back the audio content.

One potential solution to this challenge is for the playback device to switch the source of the audio content from the cloud-based computing system to a user device associated with the media playback system. In this respect, the user device can retrieve the audio content from the cloud-based computing system outside of the network and then transmit the audio content to the playback device via another communication interface that is configured to facilitate communication over a point-to-point wireless network (e.g., BLUETOOTH®). However, a user device retrieving and transmitting the audio content to the playback device may present additional technological challenges.

One challenge that is caused by transitioning the source of the audio content from the cloud-based computing device to the user device is that the transition might not be instantaneous and thus can cause a skip in the audio content or a repetition of part of the audio content after the source is switched. This skipping and/or repetition can be jarring and result in a less-than-ideal listening experience for a user.

To address this challenge, the playback device may align (e.g., using digital signal processing) the incoming audio content from the user device with the audio content the playback device is receiving from the computing system and playing back. In this respect, the playback device may be configured to buffer a portion of the audio content received from the computing system, which in turn provides the playback device additional time to align the incoming audio content from the user device. For example, the playback device may be configured to buffer up to five seconds of audio content received from the computing system before playing back the audio content. The playback device can leverage this buffered audio content by comparing the incoming audio content from the user device to the audio content remaining in the buffer. Further, the playback device can determine a point in the buffered audio content that corresponds to a point in the incoming audio content from the user device and then, at a future time, (i) begin playback of the incoming audio content at that determined point and (ii) discontinue playback of the audio content received from the computing system at that determined point. As a result, the playback device can provide a seamless transition of the source of the audio content from the computing system to the user device.

Example devices, systems, and methods configured in accordance with embodiments of this disclosure help address these and other challenges associated with switching the source of audio content on a playback device. In a first example embodiment, a first playback device may include a first communication interface configured to facilitate communication via at least one data network. The first playback device may further include a second communication interface configured to facilitate communication via a point-to-point wireless link. The first playback device may additionally include at least one processor and non-transitory computer-readable medium with program instructions stored on the non-transitory computer-readable medium that are executable by the at least one processor such that the playback device is configured to (i) while communicatively coupled with a data network via the first communication interface, receive a first stream of audio data representing audio content from a computing system, (ii) play back the audio content using the first stream of audio data; detect an indication that a source of the audio content is to switch from the computing system to a user device that is configured to obtain the audio content from the computing system, (iii) after detecting the indication, establish, via the second communication interface, a point-to-point wireless link with the user device over which to receive a second stream of audio data representing the audio content, (iv) receive, via the second communication interface, the second stream of audio data representing the audio content, (v) determine a future time at which to transition from playing back the audio content using the first stream of audio data to playing back the audio content using the second stream of audio data, (vi) identify a point in the second stream of audio data from which to begin playback of the audio content using the second stream of audio data, and (vii) at the future time, transition from playing back the audio content using the first stream of audio data to playing back the audio content using the second stream of audio data beginning from the identified point in the second stream of audio data.

In some examples, a second example embodiment may include a non-transitory computer-readable medium with program instructions stored on the non-transitory computer-readable medium that are executable by the at least one processor such that the playback device is configured to perform the functions of the first example embodiment.

In some examples, a third example embodiment may include a method of performing the functions of the first example embodiment.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
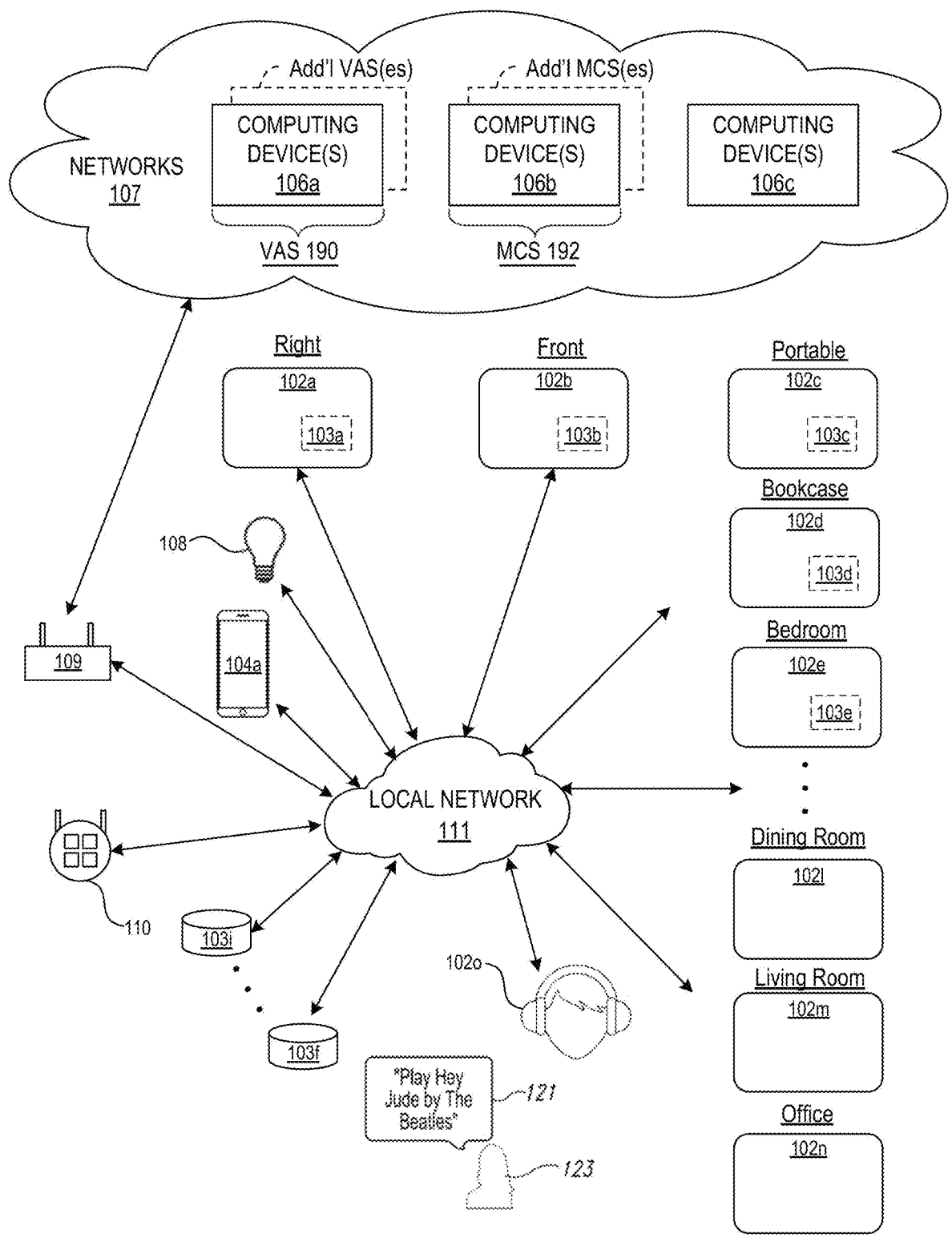
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area networks (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-

0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MIPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

While specific implementations of MPS's have been described above with respect to FIGS. 1A and 1B, there are numerous configurations of MPS's, including, but not limited to, those that do not interact with remote services, systems that do not include controllers, and/or any other configuration as appropriate to the requirements of a given application.

a. Example Playback & Network Microphone Devices

Figure 2A:
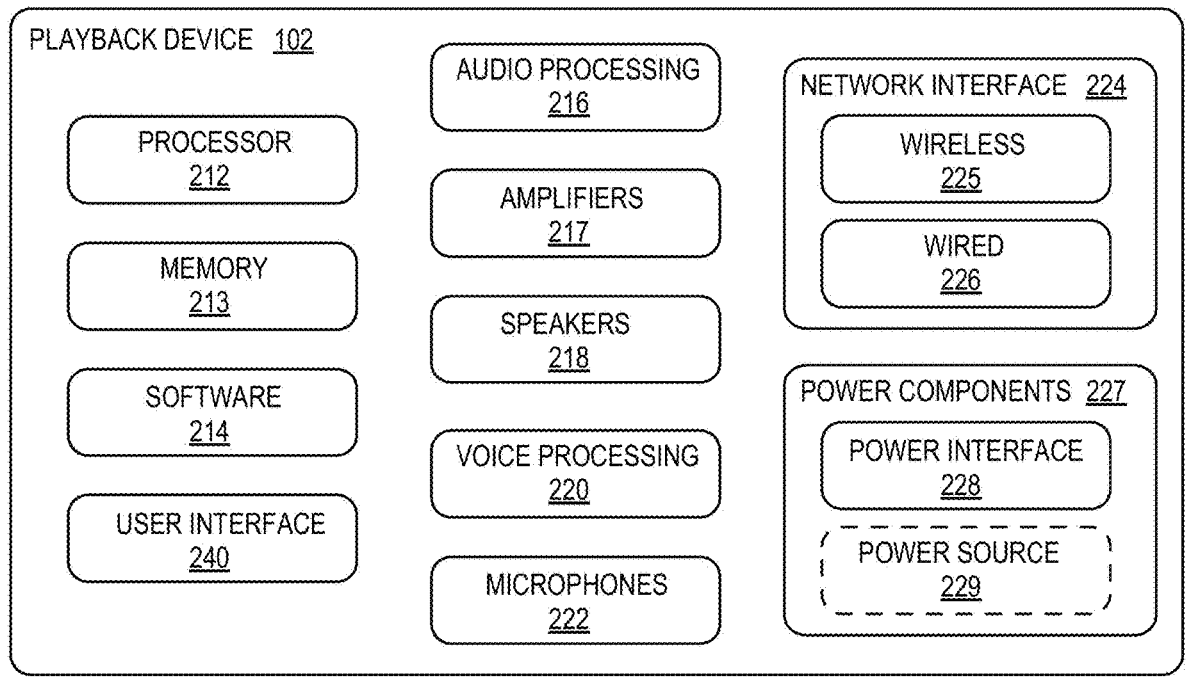
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions. The processor 212 may comprise any of a variety of processors including, for example, one or more general-purpose processors (GPPs) and/or one or more special-purpose processors (SPPs) (e.g., digital signal processors (DSPs), neural processors, etc.).

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), one or more buffers, and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Patent Publication No. 2017-0242653.

As further shown in FIG. 2A, the playback device 102 also includes power components 227. The power components 227 may include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." Those portable playback devices that weigh no more than fifty ounces (e.g., between three ounces and fifty ounces, between five ounces and fifty ounces, between ten ounces and fifty ounces, between ten ounces and twenty-five ounces, etc.) may be referred to herein as an "ultra-portable playback device." Those playback devices that operate using an external power source instead of an internal power source may be referred to herein as a "stationary playback device," although such a device may in fact be moved around a home or other environment.

The playback device 102 may further include a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
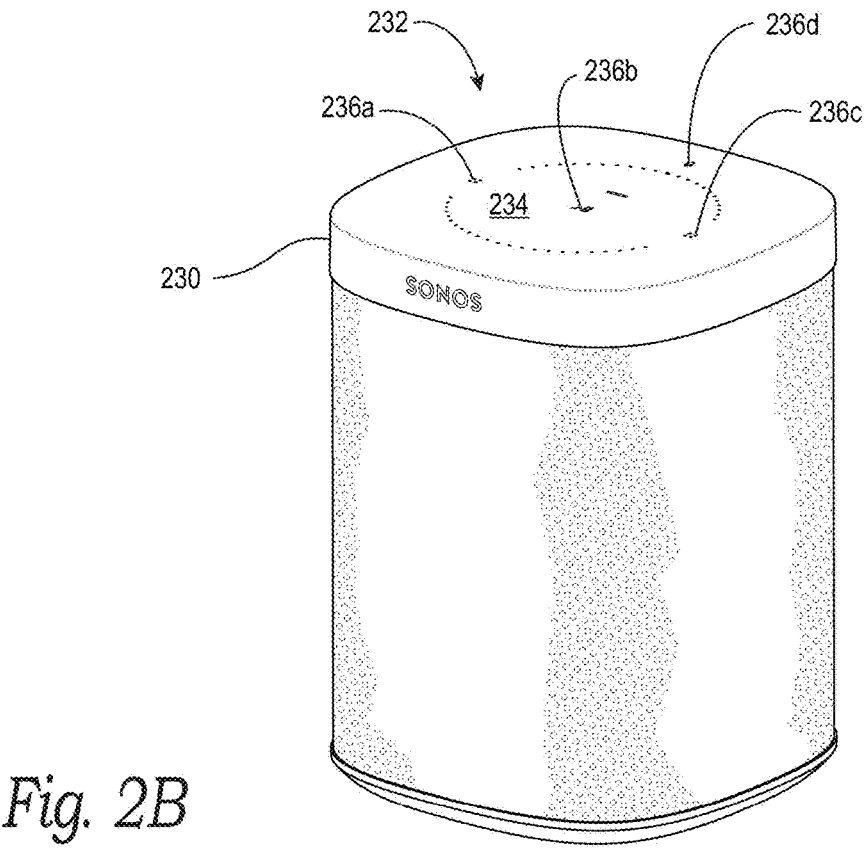
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
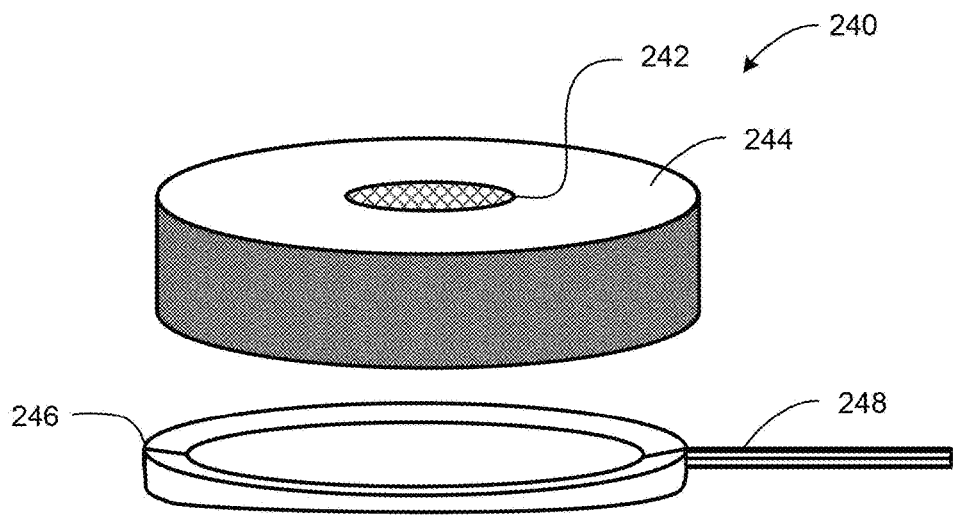
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example housing 240 for such a portable playback device. As shown, the housing 240 of the portable playback device includes a user interface in the form of a control area 242 at a top portion 244 of the housing 240. The control area 242 may include a capacitive touch sensor for controlling audio playback, volume level, and other functions. The housing 240 of the portable playback device may be configured to engage with a dock 246 that is connected to an external power source via cable 248. The dock 246 may be configured to provide power to the portable playback device to recharge an internal battery. In some embodiments, the dock 246 may comprise a set of one or more conductive contacts (not shown) positioned on the top of the docket 246 that engage with conductive contacts on the bottom of the housing 240 (not shown). In other embodiments, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2D:
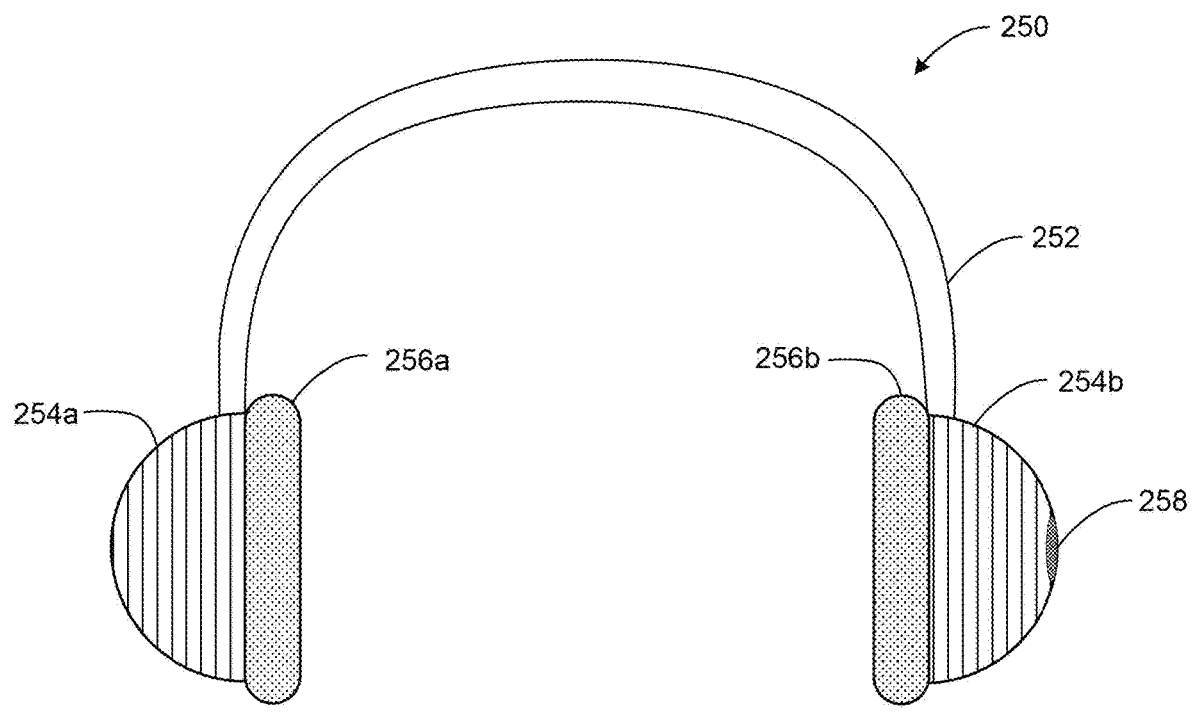
FIG. 2D is a diagram of another example housing for the playback device of FIG. 2A.

In some embodiments, the playback device 102 may take the form of a wired and/or wireless headphone (e.g., an over-ear headphone, an on-ear headphone, or an in-ear headphone). For instance, FIG. 2D shows an example housing 250 for such an implementation of the playback device 102. As shown, the housing 250 includes a headband 252 that couples a first earpiece 254a to a second earpiece 254b. Each of the earpieces 254a and 254b may house any portion of the electronic components in the playback device, such as one or more speakers. Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). In some implementations, the wired and/or wireless headphones may be ultra-portable playback devices that are powered by an internal energy source and weigh less than fifty ounces.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described above with respect to FIGS. 2A, 2B, 2C, and 2D, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from this invention. Likewise, MPS's as described herein can be used with various different playback devices.

By way of illustration, SONOS, Inc. presently offers (or has offered) for sale certain playback devices that may implement certain of the embodiments disclosed herein, including a "SONOS ONE," "PLAY:1," "PLAY:3," "PLAY: 5," "PLAYBAR," "AMP," "CONNECT:AMP," "PLAYBASE," "BEAM," "CONNECT," "SUB," and "SONOS MOVE." Any other past, present, and/or future playback devices may additionally or alternatively be used to implement the playback devices of example embodiments disclosed herein. Additionally, it should be understood that a playback device is not limited to the examples illustrated in FIG. 2A, 2B, 2C, or 2D or to the SONOS product offerings. For example, a playback device may be integral to another device or component such as a television, a lighting fixture, or some other device for indoor or outdoor use.

b. Example Playback Device Configurations

Figure 3B:
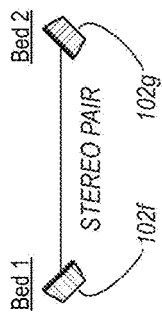
FIGS. 3A-3E are diagrams showing example playback device configurations in accordance with aspects of the disclosure.
Figure 3C:
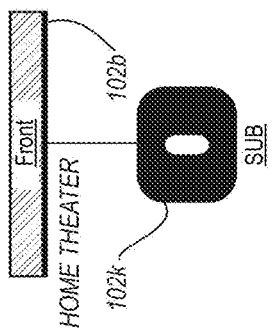
Figure 3D:
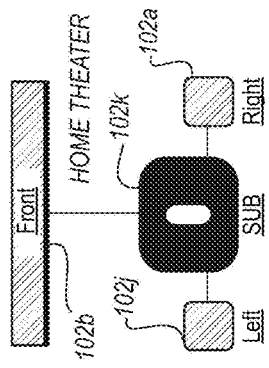
Figure 3E:
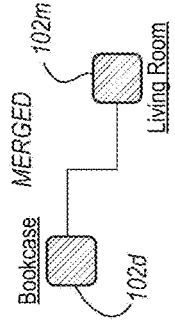
Figure 3A:
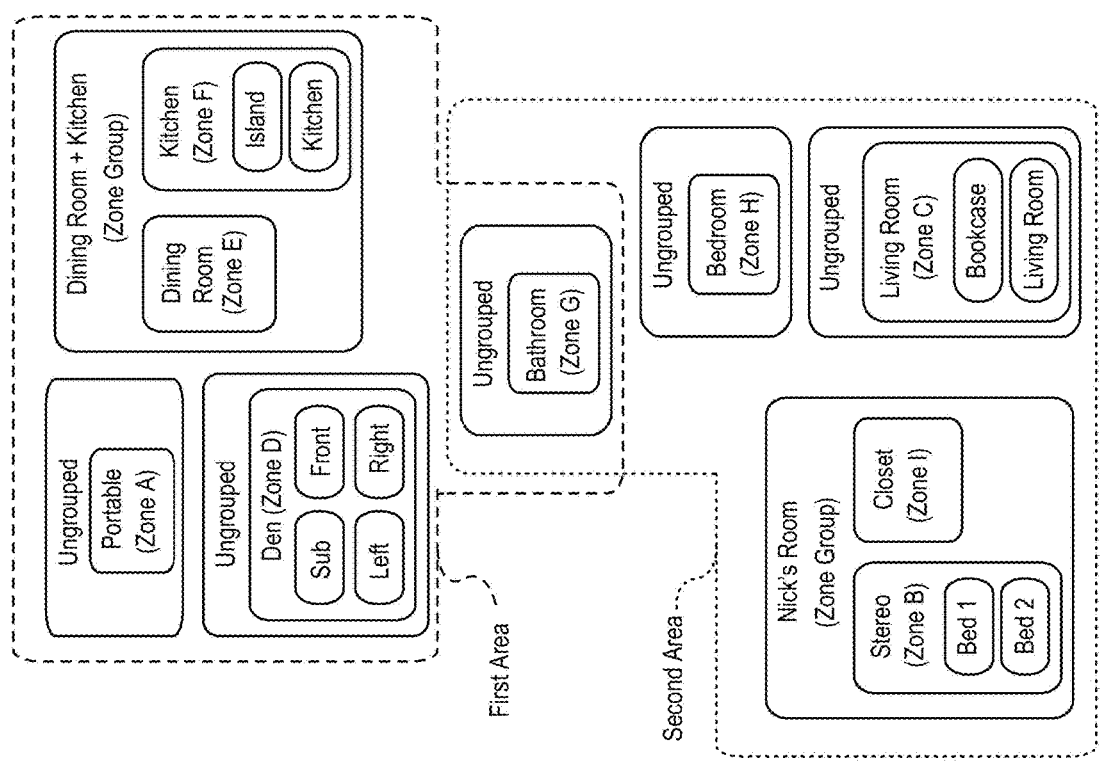

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments of the invention can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 may be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 may also include a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. Example Transition of Source of Audio Content

As previously discussed, a user may desire to move a playback device outside of the network on which it is receiving and playing back audio content. However, the user may also have an expectation that the audio content should continue to be played back by the playback device. In order to satisfy this expectation, the playback device may transition the source of the audio content from a computing system, from which the playback device was receiving the audio content for playback while connected to the network, to a user device.

Figure 5:
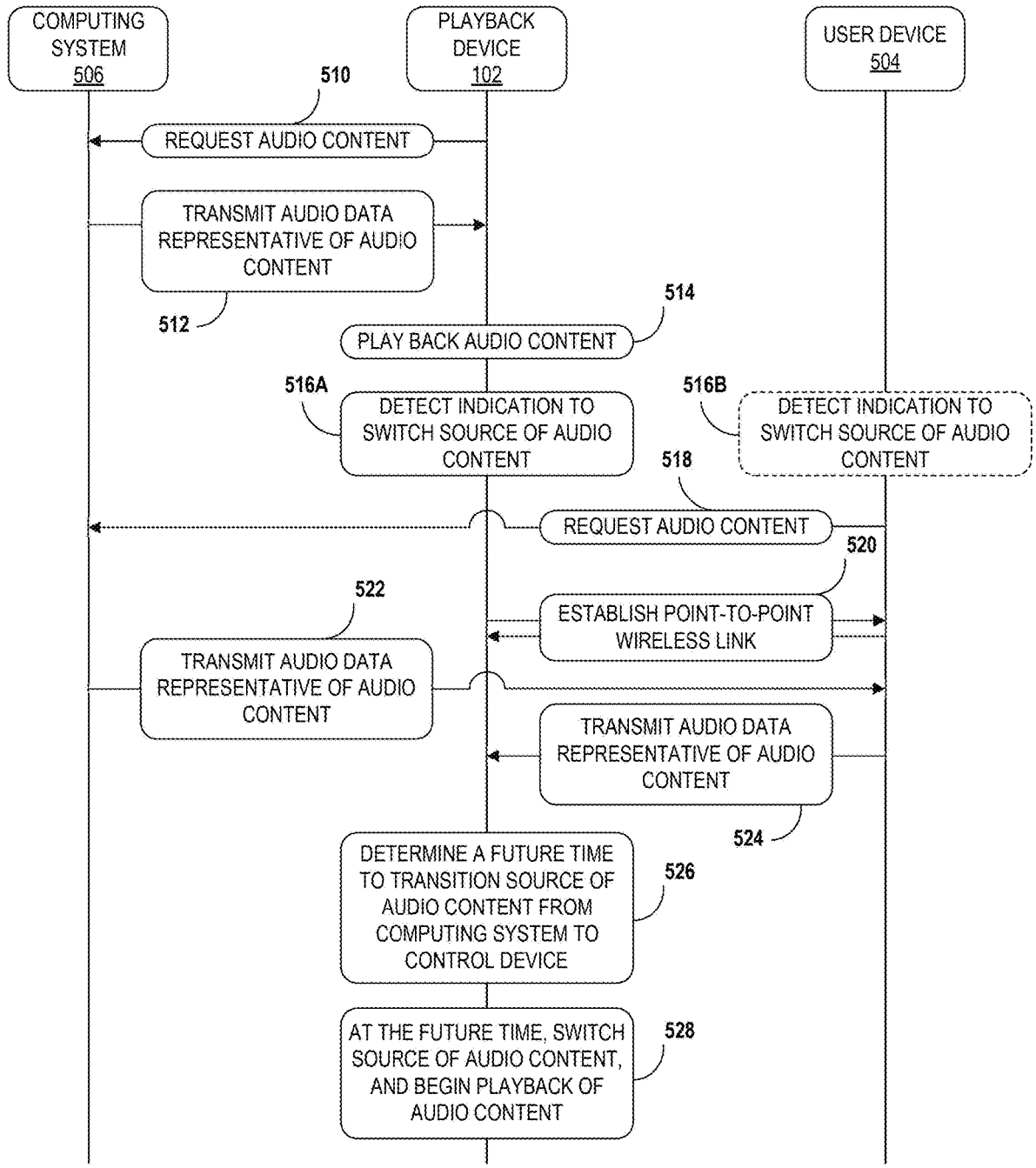
FIG. 5 is a message flow diagram between an example playback device, an example computing system, and an example user device, in accordance with aspects of the disclosure.

FIG. 5 depicts a message flow diagram 500 between a playback device 102, a user device 504, and a computing system 506 for transitioning the source of audio content. The playback device 102 may include any the playback devices 102a-102o as described above. The user device 504 may include one or more of controller devices 104a-d as described with respect to FIGS. 4A-4C above. The computing system 506 may include one or more of the remote computing devices 106a-c. As shown, the playback device 102, the user device 504, and the computing system 506 may be communicatively coupled over a network, such as the local network 111 described above with respect to FIG. 1B above and may be capable of sending and receiving messages over that network.

As shown at block 510, the playback device 102 may send a request to the computing system 506 for data representative of audio content for playback. The request may include a URI, URL, or other identifier that can be used by the computing system 506 to locate the audio content for transmission. The playback device 102 may send the request to the computing system 506 in response to a trigger event. The trigger event may take various forms.

In one example, the trigger event may be a user's voice utterance in the form of a command to play back the audio content. For instance, a user may utter "Hey Sonos, play 'Born to Run.'" This utterance may be detected by one or more devices (e.g., the playback device 102 and/or the user device 504) and may trigger the playback device 102 to send the request to the computing system 506.

In another example, the trigger event may be based on a user input via a controller device, such as user device 504. For instance, the user may open controller interface 440a of the user device 504 and select a particular track for play back. This selection may trigger the playback device 102 to send the request to the computing system 506.

In yet another example, the trigger event may include the playback device 102 receiving a message from another playback device. For instance, the playback device 102 may be grouped with another playback device (e.g., configured to play back audio content in synchrony with another playback device). In this scenario, the playback device 102 may be operating as a group coordinator (e.g., the playback device 102 may be responsible for communicating with the computing system 506 on behalf of the group). This configuration allows the playback device 102 to receive a message from one of the other playback devices in the group that indicates that a request has been made to play back audio content. In this respect, one of the other playback devices may detect a voice utterance and then send a message to the playback device 102 indicating that a request has been made. In turn, the playback device 102 may then send the request to the computing system 506.

The trigger event may take various other forms as well.

Once the playback device 102 sends the request to the computing system 506, the computing system 506 may retrieve audio data representative of the audio content. The audio data representative of the audio content may include a series of consecutive frames of audio data (e.g., a package of samples). The computing system 506 may retrieve the audio data representative of the audio content in various ways, such as the ways described above with respect to FIG. 1B.

After the computing system 506 retrieves the audio data representative of the audio content, the computing system 506 may, at block 512, transmit the audio data representative of the audio content to the playback device 102. The computing system 506 may transmit the audio data in the form of an audio data stream.

In turn, the playback device 102 may, upon receiving the stream of audio data representative of the audio content, may timestamp each frame of the audio data relative to a clock of the playback device 102. Then, at block 514, the playback device 102 may play back the audio content via one or more of speakers 218.

While playing back the audio content, the playback device 102, at block 516A, may detect an indication to switch the source of the audio content from the computing system 506 to the user device 504. In some examples, the indication may take the form of user input on the control area 242 of the playback device 102, as described with respect to FIG. 2C. For instance, the user may desire to move the playback device 102 out of range of the network to which it is connected. In turn, the user may press a button or make a gesture on the control area 242 of the playback device 102 that is configured to provide the indication to switch the source of the audio content.

Alternatively, at block 516B, the user device 504 may detect the indication to switch the source of the audio content from the computing system 506 to the user device 504. In this example, the indication may take the form of user input via a button or graphical user interface of the user device 504. After detecting the indication, the user device 504 may send a message to the playback device 102 that indicates that the source of the audio content is to switch from the computing system 506 to the user device 504.

Once the playback device 102 detects the indication to switch the source of the audio content or receives a message from the user device 504 with the indication to switch the source of the audio content, the playback device 102 may send a message to the user device 504 that indicates that the user device 504 is to become the source of the audio content for the playback device 102. In turn, at block 518, the user device 504 may send a request to the computing system 506 for audio data that is representative of the audio content already being played back on playback device 102.

After sending the request for the data representative of the audio content, the user device 504 may, at block 520, establish a point-to-point wireless link with the playback device 102. The point-to-point wireless link may serve to facilitate the transfer of the audio data from the user device 504 to the playback device 102 for play back. The point-to-point wireless link may take various forms. In one example, the point-to-point wireless link may include a BLUETOOTH® link and/or connection. In another example, the point-to-point wireless link may include Wi-Fi Direct. The point-to-point wireless link may take various other forms as well. It should be understood that while the disclosure describes the connection between the user device 504 and the playback device 102 to be a direct, point-to-point connection, a mesh connection or point-to-multipoint connection is also contemplated herein as other short-range wireless links can be implemented.

Then, at block 522, the computing system 506 may then transmit, and the user device 504 may receive, the audio data representative of the audio content. The audio data, as described above, may be in the form of an audio data stream. The computing system 506 may transmit the audio data representative of the audio content at various times. In one example, the computing system 506 may transmit the audio data immediately upon receiving the request from the user device 504. In another example, the computing system 506 may transmit the audio data after the user device 504 has established a point-to-point wireless link with the playback device 102. The computing system 506 may transmit the audio data at other times as well.

Upon receiving the audio data from the computing system 506 and the establishment of the point-to-point wireless link with the playback device 102, at block 524, the user device 504 may then transmit the audio data to the playback device 102.

The playback device 102 may then receive the audio data from the user device 504. In operation, the playback device 102 may be receiving separate audio data (e.g., streams) from each of the computing system 506 and the user device 504, but only playing back the audio data the playback device 102 is receiving from the computing system 506. However, in some embodiments, the computing system 506 may only allow one device associated with the user's account to request and/or receive the audio data. In this respect, once the computing system 506 transmits the audio data to the user device 504, the computing system 506 may cease transmitting the audio data directly to the playback device 102.

In any event, the playback device 102 may then determine when and how to transition from using the audio data from the computing system 506 to using the audio data from the user device 504 to play back the audio content. The playback device 102 may accomplish this by, at block 526, determining a future time at which to transition the source of the audio data from the computing system 506 to the user device 504. It should be understood that the future time at which to transition the source of the audio data is the time at which the clock of the playback device 102 is to trigger the transition of playing back the audio content using the audio data from the computing system 506 to playing back the audio content using the audio data from the user device 504.

In some embodiments, the future time may depend on an audio buffer of the playback device 102. For example, the playback device 102 may have a buffer that is used to process the incoming data stream. The buffer may be of varying lengths (e.g., a half of a second to five seconds or greater). As a result, in situations where the computing system 506 has ceased transmitting the audio data directly to the playback device 102, the playback device 102 may still have a portion of the transmitted audio data in its buffer. In this scenario, the playback device 102 may determine the future time to switch based on the amount of audio data still remaining in the buffer. The playback device 102, by leveraging the audio data remaining in its buffer, can offer a seamless transition between playing back the audio content using the audio data from the computing system 506 and playing back the audio content using the audio data from the user device 504.

To illustrate how the playback device 102 can leverage its buffer to determine a future point at which to transition the source of the audio data, FIG. 6A provides a timing diagram showing one example of how the playback device 102 may switch the source of the audio content.

FIG. 6A illustrates the timing of the playback device 102 receiving audio data 606 via a communication interface 602 and receiving audio data 608 via a communication interface 604. The respective communication interface 602 and the communication interface 604 may be configured to facilitate communication via respective media playback protocols as described above (e.g., WiFi, BLUETOOTH®, WiFi Direct, etc.). Further, the communication interface 602 and the communication interface 604 may be configured to facilitate communication via different and/or incompatible media playback protocols. In this respect, the communication interface 602 and the communication interface 604 may be used for different purposes. For instance, the communication interface 602 may be configured to facilitate communication via at least one data network, while the communication interface 604 may be configured to facilitate communication via the point-to-point wireless link as discussed above.

In operation, the playback device 102 may be receiving audio data 606 from the computing system 506 using the communication interface 602. At time $t_1$, (i) the computing system 506 (i) receives the request to transmit audio data 608 to the user device 504 and begins transmitting the audio data 608 to the user device 504, and (ii) ceases transmitting the audio data 606 to the playback device 102. Further, at time $t_1$, the user device 504 receives the audio data 608 from the computing system 506 and begins transmitting the audio data 608 to the playback device 102 using the communication interface 604.

After the computing system 506 ceases transmitting audio data 606 to the playback device 102, the playback device 102 may still have a portion of the audio data 606 remaining in the buffer 610. Accordingly, shortly after time $t_1$, the playback device 102 may be receiving the audio data 608 from the user device 504, but still playing the remaining, buffered portion of the audio data 606 that it received from the computing system 506. The playback device 102 may use the remaining portion of the audio data 606 to determine a future point, shown in FIG. 6A as time $t_2$, at which to transition the source of the audio data from the computing system 506 to the user device 504.

The playback device 102 may determine the future point $t_2$ in various ways. In one example, the playback device 102 may determine that the future point $t_2$ should be at the point in time associated with the last frame of audio data 606 stored in the buffer 610. In this respect, the playback device 102 may transition from playing back the audio content using audio data 606 to using audio data 608 at the last frame of the audio data 606.

In another example, the playback device 102 may determine that the future point $t_2$ should be at some point in time before the last frame of audio data 606 stored in the buffer 610. In this respect, the playback device 102 may transition from playing back the audio content using audio data 606 to using audio data 608 before the last frame or portion of the audio data 606. The playback device 102 may determine the future point $t_2$ in various other ways as well.

However, regardless of how the playback device 102 determines the future point $t_2$, the incoming audio data 608 that the playback device 102 receives from the computing system 506 may be not be aligned in time with the buffered portion of audio data 606 that playback device 102 is still playing. Thus, when the playback device 102 reaches the future point $t_2$, there may be a discontinuity in the playback of the audio content. This discrepancy between the timing of the audio data 606 and the audio data 608 can be caused by various factors, such as latency in the connection between the computing system 506, the playback device 102, and/or the user device 504. For instance, there might be latency between the user device 504 and the computing system 506 such that when the user device 504 transmits the request for the audio data 608, the computing system 506 does not begin transmitting the audio data 608 for some period of time (e.g., 0.5 milliseconds to one second). During this latency period, the playback device 102 continues to play back the audio content using the audio data 606. Thus, when the user device 504 sends the audio data 608 to the playback device 102, the playback device 102 may have already advanced to a later frame in the audio content 606 than the first received frame of the audio content 608. If this discrepancy is not addressed, the first frame that playback device 102 plays back from audio data 608 at time $t_2$ may correspond to a frame that was already played from audio data 606. This may cause playback by the playback device 102 to appear to "skip backwards" in time, which may provide for an undesirable user experience.

The playback device 102 may remedy this discrepancy in various ways. In one example, the playback device 102 may determine a point $p_1$ in the audio data 606 that corresponds to a point $p_2$ in the audio data 608. The playback device 102 may determine this by analyzing the incoming frames of audio data 608 and comparing them to the frames of audio data 606 that are remaining in the buffer 610. In this respect, the playback device 102 can determine the point $p_2$ in the audio data 608 from which the playback device 102 should begin playing back the audio content when the playback device 102 reaches the future time $t_2$.

In another example, the playback device 102 may manipulate the incoming audio data 608 by removing (e.g., dropping) frames of the incoming audio data 608 until the playback device 102 determines that the next frame of the audio data 608 corresponds to the frame of audio data 606 that is going to be played at the future time $t_2$.

The playback device 102 may remedy the timing discrepancy between the audio data 606 and the audio data 608 in other ways as well.

In some embodiments, the playback device 102 may be unable to leverage the remaining audio data 606 remaining in the buffer 610. This may occur when the latency between the computing system 506, the user device 504, and the playback device 102 is so great that the playback device 102 receives the audio data 608 from the user device 504 after the playback device 102 has finished playing back the audio data 606 remaining in the buffer 610. In these embodiments, the playback device 102 may be unable to provide a seamless transition between playing back the audio content using the audio data 606 and playing back the audio content using the audio data 608. In turn, there might be a gap in the playback of the audio content or in some cases, a repetition of some of the audio content when the playback device 102 receives and beings to play back the audio content using the audio data 608.

The playback device 102 may overcome this technical challenge in various ways. In one example, the playback device 102 may issue feedback to mask the gap in the playback of the audio content. This feedback may take various forms. In one example, the feedback may take the form of an audio tone that indicates to a user that the playback device 102 has switched from playing back the audio content using the audio data 606 to playing back the audio content using the audio data 608. In this respect, the audio tone may serve as a notification to the user that there may be a discrepancy in the audio playback due to one or more circumstances outside the control of the playback device 102. In another example, the feedback may take the form of haptic feedback that indicates to a user that the playback device 102 has switched from playing back the audio content using the audio data 606 to playing back the audio content using the audio data 608. In this respect, the haptic feedback may serve as a notification to the user that there may be a discrepancy in the audio playback due to one or more circumstances outside the control of the playback device 102. The feedback provided by the playback device 102 may take other forms as well.

In another example, the playback device 102 may cease play back of the audio content until such a time that the playback device 102 can play back the audio content from the last frame of audio data 606. For instance, the playback device 102 may determine (e.g., using a processor, such as a DSP) the point at which the playback device 102 should begin playback of the audio content using the audio data 608 to avoid repetition of any portion of the audio content. In this respect, even though there may be an audible pause in the playback of the audio content, the user experience will not involve re-listening to the audio content.

The playback device 102 may overcome the technical challenge of finishing playing back the audio content using the audio data 606 remaining in the buffer 610 before receiving the audio data 608 in other manners as well.

In certain situations, the music service provider associated with the computing system 506 may permit the sending of multiple streams of audio data using the credentials of a single account. In these situations, the playback device 102 may receive the audio data 606 from the computing system 506 and the audio data 608 from the user device 504 concurrently with one another. In this respect, the playback device 102 may then be able to leverage its DSP (or other processor) to determine the point $p_2$ in the audio data 608 that corresponds to the point $p_1$ in the audio data 606 that the playback device 102 is using to play back the audio content.

To help illustrate this scenario, FIG. 6B provides an alternative timing diagram in which the playback device 102 is simultaneously receiving the audio data 606 and the audio data 608.

As shown in FIG. 6B, the playback device 102 may be receiving audio data 606 from the computing system 506 using the communication interface 602. At time $t_1$, the computing system 506 (i) receives the request to transmit audio data 608 to the user device 504, and (ii) while still transmitting audio data 606 to the playback device 102, begins transmitting the audio data 608 to the user device 504. Also at time $t_1$, the playback device 102 begins receiving the audio data 608 from the user device 504 using the communication interface 604.

In this respect, at time $t_1$, the playback device 102 may then be receiving both the audio data 606 and the audio data 608 from the computing system 506 and the user device 504, respectively. The playback device 102 may then leverage both the audio data 606 and the audio data 608 to determine the future time $t_2$ at which to transition from playing back the audio content using the audio data 606 to using the audio data 608. The playback device 102 may accomplish this by utilizing a DSP module to analyze the incoming audio data 606 and the incoming audio data 608 to determine a point $p_1$ in the audio data 606 that corresponds to a point $p_2$ in the audio data 608. In this respect, the playback device 102 may drop frames of the audio data 608 until the audio data 606 and the audio data 608 are at the same frame.

After dropping the frames of the audio data 608, the playback device 102 may determine a future time $t_2$, at which point the playback device 102 is able to make a seamless transition between playing back the audio content using the audio data 606 to playing back the audio content using the audio data 608. The future time $t_2$, in practice, can be any time after the playback device 102 has synchronized the audio data 606 with the audio data 608. In one example, the future time $t_2$ can be immediately upon completion of the synchronization by the playback device 102. In another example, the future time $t_2$ can be some predefined amount of time after the synchronization by the playback device 102.

In some examples, one or more of the operations described herein to determine when and how to transition the audio (e.g., with respect to block 526 in FIG. 5) may be offloaded from the playback device 102 to one or more external devices (e.g., the computing system 506 and/or user device 504). For example, the playback device 102 may transmit information (e.g., regarding one or more states of the playback device such as the state of one or more audio buffers) to the one or more external devices and the one or more external devices may determine the future time at which to transition the audio based on the information received from the playback device 102. In this example, the one or more external devices may transmit the calculated future time at which to transition to the playback device 102.

Returning to block 528 of FIG. 5, once the playback device 102 has determined the future time to transition from playing back the audio content using the audio data 606 to playing back the audio content using the audio data 608, the playback device 102 may then transition the source of the audio data representative of the audio content from the computing system 506 to the user device 504 at the future time. The playback device 102 may transition the source of the audio data in various ways.

In one example, the playback device 102 may transition the source of the audio data by ceasing play back of the audio content using the audio data 606 received from the computing system 506 and beginning play back of the audio content using the audio data 608 received from the user device 504. In this example, after ceasing play back of the audio content using the audio data 606 received from the computing system 506, the playback device 102 may transmit a message to the computing system 506 with instructions to cease transmitting the audio data 606 representative of the audio content to the playback device 102.

In another example, the playback device 102 may transition the source of the audio data by beginning play back of the audio content using the audio data 608 received from the user device 504 after the playback device has played back all of the audio data remaining in its buffer. As discussed above, this example may involve the playback device 102 determining that the future time at which to transition the source of the audio content occurs upon the playback device 102 playing back the last frame of the audio data received from the computing system 506.

The playback device 102 may transition the source of the audio data in various other ways as well.

After the playback device 102 has transitioned the source of the audio data representative of the audio content from the computing system 506 to the user device 504, a user is able to remove the playback device 102 from the network on which it was receiving the audio data from the computing system 506. For instance, the user can take the playback device 102 from the user's home to a public area, such as park, and continue to play back the audio content via the audio data received from the user device 504.

After the user has taken the playback device 102 outside of the network area, the user may desire to bring the playback device 102 back within range of the network. In these circumstances, it may be beneficial for the playback device 102 to transition back to playing back the audio content using audio data from the computing system 506.

The playback device 102 may transition back to playing back the audio content using audio data from the computing system 506 in various ways.

In one example, the playback device 102 may be configured to constantly search for the network over which the playback device 102 previously received the audio data from the computing system 506. In turn, the playback device 102 may automatically send a request for audio data representative of the audio content to the computing system 506 upon detecting that the playback device 102 has reconnected to the network. The computing system 506 may then transmit the audio data to the playback device 102 as described above. Upon receiving the audio data from the computing system 506, the playback device 102 may transition the source of the audio content from the audio data it is receiving from the user device 504 to the audio data it is receiving from the computing system 506. The playback device 102 may make this transition in the same or similar manners as described above when the playback device 102 was transitioning the source of the audio content from the computing system 506 to the user device 504.

In another example, the playback device 102 may transition back to playing back the audio content using the audio data from the computing system 506 in response to a trigger event. The trigger event may be similar to the trigger event described above with respect to the playback device 102 transmitting a request for the audio data representative of the audio content to the computing system 506 (e.g., a voice utterance, user input via user device 504, and/or a message from another playback device).

The playback device 102 may transition back to playing back the audio content using the audio data from the computing system 506 in various other ways as well.

In some embodiments, the playback device 102 may be grouped with other playback devices in a media playback system at the time the playback device 102 detects the indication that the source of the audio content is to switch from the computing system 506 to the user device 504. In these scenarios, the playback device 102 may respond differently depending on the configuration of the group in which the playback device 102 is operating.

In one example, if the playback device 102 is configured to operate as the group coordinator of the group, the playback device 102 may, in response to detecting the indication that the source of the audio content is to switch from the computing system 506 to the user device 504, (i) assign the group coordinator status to another playback device in the group, and (ii) ungroup from the group. After performing these steps, the playback device 102 can then switch the source of the audio content as described above.

In another example, if the playback device 102 is configured to operate as a group member, but not the group coordinator, of the group, the playback device 102 may, in response to detecting the indication that the source of the audio content is to switch from the computing system 506 to the user device 504, ungroup from the group.

In some embodiments, once the playback device 102 is ungrouped and playing back audio content using audio data it is receiving from the user device 504, a user may want to group the playback device 102 with other playback devices that are operating in a similar fashion (e.g., playing back audio content using audio data that they are receiving from respective controller devices 104). In these scenarios, the playback device 102 may be configured to connect with the other playback devices as though the playback device 102 and the other playback devices were on the same LAN. For instance, the playback device 102 may be configured to detect one or more other playback devices in the area that are configured with the capability to play back the audio content in synchrony with the playback device 102. After detecting the one or more other playback devices, the playback device 102 may broadcast a signal that allows the one or more other playback devices to establish a connection with the playback device 102. The signal that is broadcasted by the playback device 102 may take various forms. In one example, the signal may be a local Wi-Fi signal that creates a local area network to which the one or more other playback devices can connect. In another example, the signal may create a mesh or point-to-multipoint wireless link to which the one or more other playback devices can connect. The signal that is broadcasted by the playback device 102 may take various other forms as well.

In any event, once the playback device 102 is connected to the one or more other playback devices, the playback device 102 can propagate the audio data it is receiving from the user device 504. In turn, the one or more other playback devices can receive the audio data and play back the audio content in synchrony with the playback device 102.

IV. Example Methods for Seamless Transition of Source of Audio Content

Figure 7:
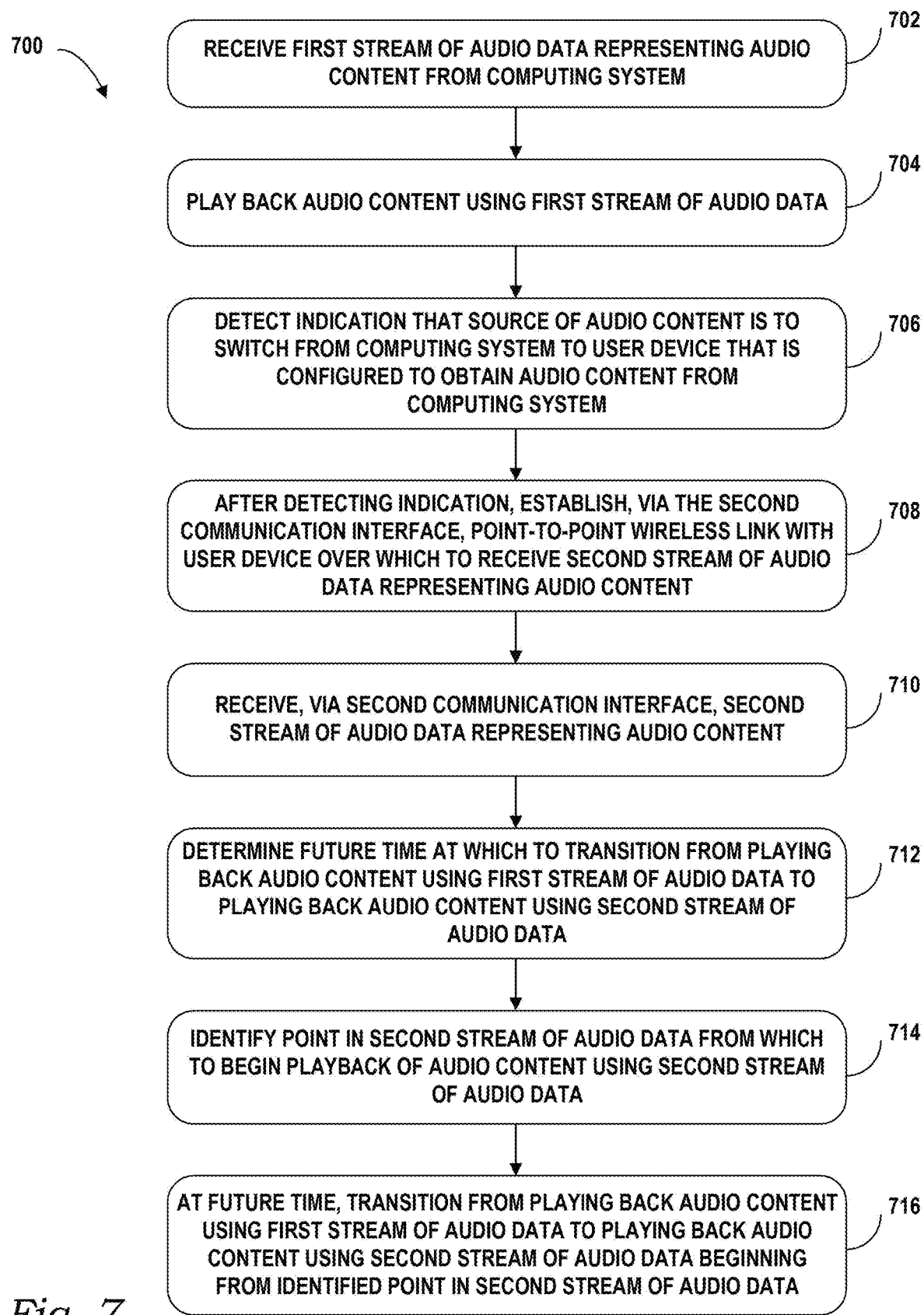
FIG. 7 is a flow diagram of an example method in accordance with aspects of the disclosure.

FIG. 7 shows an example embodiment of a method 700 that can be implemented by a playback device, such as the playback device 102 described with respect to FIGS. 2A, 2B, 2C, 2D, 5, 6A and 6B.

Various embodiments of method 700 include one or more operations, functions, and actions illustrated by blocks 702 through 716. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

The method 700 begins at block 702, which includes a playback device receiving a first stream of audio data representing audio content from a computing system. The playback device includes a first communication interface configured to facilitate communication via at least one data network and a second communication interface configured to facilitate communication via a point-to-point wireless link.

At block 704, the method 700 includes playing back the audio content using the first stream of audio data.

At block 706, the method 700 includes detecting an indication that a source of the audio content is to switch from the computing system to a user device that is configured to obtain the audio content from the computing system.

In some embodiments, detecting an indication that a source of the audio content is to switch from the computing system to a user device involves detecting a user input at the playback device indicating that the source of the audio content is to switch from the computing system to the user device.

At block 708, the method 700 includes, after detecting the indication, establishing, via the second communication interface, a point-to-point wireless link with the user device over which to receive a second stream of audio data representing the audio content.

In some embodiments, the point-to-point wireless link is a BLUETOOTH® link.

At block 710, the method 700 includes receiving, via the second communication interface, the second stream of audio data representing the audio content.

At block 712, the method 700 includes determining a future time at which to transition from playing back the audio content using the first stream of audio data to playing back the audio content using the second stream of audio data.

In some embodiments, the playback device is configured to buffer at least a portion of the first stream of audio data. In these embodiments, determining a future time at which to transition from playing back the audio content using the first stream of audio data to playing back the audio content using the second stream of audio data involves determining the future time at which to transition from playing back the audio content using the second stream of audio data based on an amount of data remaining in the buffered portion of the first stream of audio data.

At block 714, the method 700 includes identifying a point in the second stream of audio data from which to begin playback of the audio content using the second stream of audio data.

In some embodiments, the playback device is further configured to buffer at least a portion of the second stream of audio data. In these embodiments, identifying a point in the second stream of audio data from which to begin playback of the audio content using the second stream of audio data involves determining a point in the buffered portion of the first stream of audio data that corresponds to the future time and identifying a point in the buffered portion of the second stream of audio data that aligns with the determined point in the buffered portion of the first stream of audio data.

At block 716, the method 700 includes, at the future time, transitioning from playing back the audio content using the first stream of audio data to playing back the audio content using the second stream of audio data beginning from the identified point in the second stream of audio data.

Some embodiments further include (i) detecting an indication that the source of the audio content is to switch from the user device back to the computing system, (ii) receiving, via the first communication interface, a third stream of audio data representing the audio content, (iii) after detecting the indication, determining a second future time at which to transition from playing back the audio content using the second stream of audio data to playing back the audio content using the third stream of audio data, (iv) identifying a point in the third stream of audio data from which to begin playback of the audio content using the third stream of audio data, and (v) at the second future time, transitioning from playing back the audio content using the second stream of audio data to playing back the audio content using the third stream of audio data beginning from the identified point in the third stream of audio data.

Some embodiments further include (i) detecting whether the data network is available to be communicatively coupled via the first communication interface, (ii) receiving, via the first communication interface, a third stream of audio data representing the audio content, (iii) based on detecting that the data network is available, determining a second future time at which to transition from playing back the audio content using the second stream of audio data to playing back the audio content using the third stream of audio data, (iv) identifying a point in the third stream of audio data from which to begin playback of the audio content using the third stream of audio data, and (v) at the second future time, transitioning from playing back the audio content using the second stream of audio data to playing back the audio content using the third stream of audio data beginning from the identified point in the third stream of audio data.

In some embodiments, the computing system includes a cloud-based computing system.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
   a first communication interface configured to facilitate communication via at least one data network;
   a second communication interface configured to facilitate communication via a point-to-point wireless link;
   at least one processor;
   non-transitory computer-readable medium; and
   program instructions stored on the non-transitory computer-readable medium that are executable by the at least one processor such that the playback device is configured to:

while communicatively coupled with a data network via the first communication interface, receive a first stream of audio data representing audio content from a computing system;

buffer at least a portion of the first stream of audio data;

play back the audio content using the first stream of audio data;

detect an indication that a source of the audio content is to switch from the computing system to a user device that is configured to obtain the audio content from the computing system;

after detecting the indication, establish, via the second communication interface, a point-to-point wireless link with the user device over which to receive a second stream of audio data representing the audio content;

receive, via the second communication interface, the second stream of audio data representing the audio content;

buffer at least a portion of the second stream of audio data;

determine, based on an amount of data remaining in the buffered portion of the first stream of audio data, a future time at which to transition from playing back the audio content using the first stream of audio data to playing back the audio content using the second stream of audio data;

determine a point in the buffered portion of the first stream of audio data that corresponds to the future time;

identify a point in the buffered portion of the second stream of audio data that aligns with the determined point in the buffered portion of the first stream of audio data; and at the future time, transition from playing back the audio content using the first stream of audio data to playing back the audio content using the second stream of audio data beginning from the identified point in the buffered portion of the second stream of audio data.

2. The playback device of claim 1, wherein the program instructions that are executable by the at least one processor such that the playback device is configured to detect the indication that the source of the audio content is to switch from the computing system to the user device comprise program instructions that are executable by the at least one processor such that the playback device is configured to receive a message from the user device indicating that the source of the audio content is to switch from the computing system to the user device.

3. The playback device of claim 1, wherein the program instructions that are executable by the at least one processor such that the playback device is configured to detect the indication that the source of the audio content is to switch from the computing system to the user device comprise program instructions that are executable by the at least one processor such that the playback device is configured to detect a user input at the playback device indicating that the source of the audio content is to switch from the computing system to the user device.

4. The playback device of claim 1, wherein the point-to-point wireless link is a BLUETOOTH® link.

5. The playback device of claim 1, further comprising program instructions stored on the non-transitory computer-readable medium that are executable by the at least one processor such that the playback device is configured to:

detect an indication that the source of the audio content is to switch from the user device back to the computing system;

receive, via the first communication interface, a third stream of audio data representing the audio content;

after detecting the indication, determine a second future time at which to transition from playing back the audio content using the second stream of audio data to playing back the audio content using the third stream of audio data;

identify a point in the third stream of audio data from which to begin playback of the audio content using the third stream of audio data; and at the second future time, transition from playing back the audio content using the second stream of audio data to playing back the audio content using the third stream of audio data beginning from the identified point in the third stream of audio data.

6. The playback device of claim 1, further comprising program instructions stored thereon that are executable by the at least one processor such that the playback device is configured to:

detect whether the data network is available to be communicatively coupled via the first communication interface;

receive, via the first communication interface, a third stream of audio data representing the audio content;

based on detecting that the data network is available, determine a second future time at which to transition from playing back the audio content using the second stream of audio data to playing back the audio content using the third stream of audio data;

identify a point in the third stream of audio data from which to begin playback of the audio content using the third stream of audio data; and at the second future time, transition from playing back the audio content using the second stream of audio data to playing back the audio content using the third stream of audio data beginning from the identified point in the third stream of audio data.

7. The playback device of claim 1, wherein the computing system comprises a cloud-based computing system.

8. A non-transitory computer-readable medium comprising program instructions stored thereon that are executable by at least one processor such that a playback device is configured to:

while communicatively coupled with a data network via a first communication interface configured to facilitate communication via at least one data network, receive a first stream of audio data representing audio content from a computing system;

buffer at least a portion of the first stream of audio data;

play back the audio content using the first stream of audio data;

detect an indication that a source of the audio content is to switch from the computing system to a user device that is configured to obtain the audio content from the computing system;

after detecting the indication, establish, via a second communication interface configured to facilitate communication via a point-to-point wireless link, a point-to-point wireless link with the user device over which to receive a second stream of audio data representing the audio content;

receive, via the second communication interface, the second stream of audio data representing the audio content;

buffer at least a portion of the second stream of audio data;

determine, based on an amount of data remaining in the buffered portion of the first stream of audio data, a future time at which to transition from playing back the audio content using the first stream of audio data to playing back the audio content using the second stream of audio data;

determine a point in the buffered portion of the first stream of audio data that corresponds to the future time;

identify a point in the buffered portion of the second stream of audio data that aligns with the determined point in the buffered portion of the first stream of audio data; and at the future time, transition from playing back the audio content using the first stream of audio data to playing back the audio content using the second stream of audio data beginning from the identified point in the buffered portion of the second stream of audio data.

9. The computer-readable medium of claim 8, wherein the program instructions that are executable by the at least one processor such that the playback device is configured to detect the indication that the source of the audio content is to switch from the computing system to the user device comprise program instructions that are executable by the at least one processor such that the playback device is configured to receive a message from the user device indicating that the source of the audio content is to switch from the computing system to the user device.

10. The computer-readable medium of claim 8, wherein the program instructions that are executable by the at least one processor such that the playback device is configured to detect the indication that the source of the audio content is to switch from the computing system to the user device comprise program instructions that are executable by the at least one processor such that the playback device is configured to detect a user input at the playback device indicating that the source of the audio content is to switch from the computing system to the user device.

11. The computer-readable medium of claim 8, wherein the point-to-point wireless link is a BLUETOOTH® link.

12. The computer-readable medium of claim 8, further comprising program instructions stored thereon that are executable by the at least one processor such that the playback device is configured to:
  detect an indication that the source of the audio content is to switch from the user device back to the computing system;
  receive, via the first communication interface, a third stream of audio data representing the audio content;
  after detecting the indication, determine a second future time at which to transition from playing back the audio content using the second stream of audio data to playing back the audio content using the third stream of audio data;
  identify a point in the third stream of audio data from which to begin playback of the audio content using the third stream of audio data; and
  at the second future time, transition from playing back the audio content using the second stream of audio data to playing back the audio content using the third stream of audio data beginning from the identified point in the third stream of audio data.

13. The computer-readable medium of claim 8, further comprising program instructions stored thereon that are executable by the at least one processor such that the playback device is configured to:
  detect whether the data network is available to be communicatively coupled via the first communication interface;
  receive, via the first communication interface, a third stream of audio data representing the audio content;
  based on detecting that the data network is available, determine a second future time at which to transition from playing back the audio content using the second stream of audio data to playing back the audio content using the third stream of audio data;
  identify a point in the third stream of audio data from which to begin playback of the audio content using the third stream of audio data; and
  at the second future time, transition from playing back the audio content using the second stream of audio data to playing back the audio content using the third stream of audio data beginning from the identified point in the third stream of audio data.

14. The computer-readable medium of claim 8, wherein the computing system comprises a cloud-based computing system.

15. A method comprising:
  while communicatively coupled with a data network via a first communication interface configured to facilitate communication via at least one data network, receiving, by a playback device, a first stream of audio data representing audio content from a computing system;
  buffering, by the playback device, at least a portion of the first stream of audio data;
  playing back, by the playback device, the audio content using the first stream of audio data;
  detecting, by the playback device, an indication that a source of the audio content is to switch from the computing system to a user device that is configured to obtain the audio content from the computing system;
  after detecting the indication, establishing, by the playback device via a second communication interface configured to facilitate communication via a point-to-point wireless link, a point-to-point wireless link with the user device over which to receive a second stream of audio data representing the audio content;
  receiving, by the playback device via the second communication interface, the second stream of audio data representing the audio content;
  buffering, by the playback device, at least a portion of the second stream of audio data;
  determining, by the playback device based on an amount of data remaining in the buffered portion of the first stream of audio data, a future time at which to transition from playing back the audio content using the first stream of audio data to playing back the audio content using the second stream of audio data;
  determining, by the playback device, a point in the buffered portion of the first stream of audio data that corresponds to the future time;
  identifying, by the playback device, a point in the buffered portion of the second stream of audio data that aligns with the determined point in the buffered portion of the first stream of audio data; and
  at the future time, transitioning, by the playback device, from playing back the audio content using the first stream of audio data to playing back the audio content using the second stream of audio data beginning from the identified point in the buffered portion of the second stream of audio data.

16. The method of claim 15, wherein detect the indication that the source of the audio content is to switch from the computing system to the user device comprises receiving a message from the user device indicating that the source of the audio content is to switch from the computing system to the user device.

17. The method of claim 15, wherein detecting the indication that the source of the audio content is to switch from the computing system to the user device comprises detecting a user input at the playback device indicating that the source of the audio content is to switch from the computing system to the user device.

18. The method of claim 15, wherein the point-to-point wireless link is a BLUETOOTH® link.

19. The method of claim 15, further comprising:
detecting an indication that the source of the audio content is to switch from the user device back to the computing system;
receiving, via the first communication interface, a third stream of audio data representing the audio content;
after detecting the indication, determining a second future time at which to transition from playing back the audio content using the second stream of audio data to playing back the audio content using the third stream of audio data;
identifying a point in the third stream of audio data from which to begin playback of the audio content using the third stream of audio data; and
at the second future time, transitioning from playing back the audio content using the second stream of audio data to playing back the audio content using the third stream of audio data beginning from the identified point in the third stream of audio data.

20. The method of claim 15, further comprising:
detecting whether the data network is available to be communicatively coupled via the first communication interface;
receiving, via the first communication interface, a third stream of audio data representing the audio content;
based on detecting that the data network is available, determining a second future time at which to transition from playing back the audio content using the second stream of audio data to playing back the audio content using the third stream of audio data;
identifying a point in the third stream of audio data from which to begin playback of the audio content using the third stream of audio data; and
at the second future time, transitioning from playing back the audio content using the second stream of audio data to playing back the audio content using the third stream of audio data beginning from the identified point in the third stream of audio data.

* * * * *